United States Patent
Kaiser

(10) Patent No.: US 7,536,378 B2
(45) Date of Patent: May 19, 2009

(54) COPY TEMPLATE/READ ONLY DATA IN APPLICATION TABLES

(75) Inventor: Martin Kaiser, Speyer (DE)

(73) Assignee: SAP AG, Walldorf (DE)

(*) Notice: Subject to any disclaimer, the term of this patent is extended or adjusted under 35 U.S.C. 154(b) by 126 days.

(21) Appl. No.: 10/956,190

(22) Filed: Sep. 30, 2004

(65) Prior Publication Data

US 2006/0085372 A1    Apr. 20, 2006

(51) Int. Cl.
*G06F 7/06* (2006.01)
*G06F 7/02* (2006.01)

(52) U.S. Cl. .............. 707/2; 707/1; 707/10; 717/124; 717/135

(58) Field of Classification Search .......... 707/1–10, 707/201–202; 717/124–135
See application file for complete search history.

(56) References Cited

U.S. PATENT DOCUMENTS

| | | | | |
|---|---|---|---|---|
| 5,561,763 A | * | 10/1996 | Eto et al. ................ | 714/35 |
| 5,642,504 A | * | 6/1997 | Shiga ..................... | 707/10 |
| 5,675,785 A | * | 10/1997 | Hall et al. ............... | 707/102 |
| 5,920,858 A | * | 7/1999 | Kitabayashi et al. ..... | 707/4 |
| 5,930,791 A | * | 7/1999 | Leu ........................ | 707/8 |
| 5,956,730 A | * | 9/1999 | Burroughs et al. ....... | 707/104.1 |
| 6,106,298 A | * | 8/2000 | Pollak .................... | 434/29 |
| 6,125,442 A | * | 9/2000 | Maves et al. ............ | 712/220 |
| 6,134,549 A | * | 10/2000 | Regnier et al. ........... | 707/9 |
| 6,192,375 B1 | | 2/2001 | Gross | |
| 6,199,069 B1 | | 3/2001 | Dettinger et al. | |
| 6,233,584 B1 | * | 5/2001 | Purcell .................... | 707/103 X |
| 6,401,087 B2 | * | 6/2002 | Yanagimoto .............. | 707/5 |
| 7,024,420 B2 | | 4/2006 | Ball et al. | |
| 7,035,384 B1 | * | 4/2006 | Scherer ................... | 379/88.19 |
| 7,054,865 B2 | * | 5/2006 | Kato et al. ............... | 707/10 |

OTHER PUBLICATIONS

IBM Technical Disclosure Bulletin, "Mapping a Relational Database to a Hierarchical File System," vol. 38, No. 10, pp. 309-311, Oct. 1995.*

* cited by examiner

*Primary Examiner*—Hyung S Sough
*Assistant Examiner*—Hamdy S Ahmed
(74) *Attorney, Agent, or Firm*—Kenyon & Kenyon LLP

(57) ABSTRACT

A technique for maintenance and utilization of templates in a database. In response to a database access request in a productive data database access configuration, a database interface facilitates access to a template database when a template switch is enabled. The database interface facilitates normal database access when the template switch is disabled.

25 Claims, 8 Drawing Sheets

COPY TEMPLATE/READ ONLY DATA IN APPLICATION TABLES

BACKGROUND

It is common to use templates when creating entries for a database. To this end, many systems, components, modules, or applications deliver templates to enhance usability of the system, application, or transaction. This typically involves creating extra database tables containing the templates, hard-coding templates in the source code or extracting/importing the templates from database tables or other (possibly external) sources. However, these techniques require maintenance transactions for editing template data at design time as well as additional read access to template data at runtime. Moreover, it is often not possible to adopt template data to customer needs.

BRIEF DESCRIPTION OF THE DRAWINGS

Embodiments of the invention are illustrated in the figures. However, the embodiments and figures are illustrative rather than limiting; they provide examples of the invention. The invention is limited only by the claims.

DETAILED DESCRIPTION OF THE INVENTION

A technique for template maintenance and utilization in a database involves receiving a database access request in a productive data database access configuration, providing a database interface, and making, through the database interface, a database query. The database query is in a template data database access configuration if the template switch is enabled and in a productive data database access configuration if the template switch is disabled. A system developed according to the technique may include a template switch that may be set to enabled or disabled and an object factory configured to instantiate a database interface in response to a database access request. The database access request may have a productive data database access configuration. The database interface facilitates making a database query in a template data database access configuration if the template switch is enabled. The database interface facilitates making a database query in the productive data database access configuration if the template switch is disabled. In operation, the system facilitates setting an environment variable to enable read-write access to template data, receiving a request for a database interface, and producing a database interface with access to template data in accordance with the environment variable. The database interface may redirect database access requests toward the template data.

Figure 1:
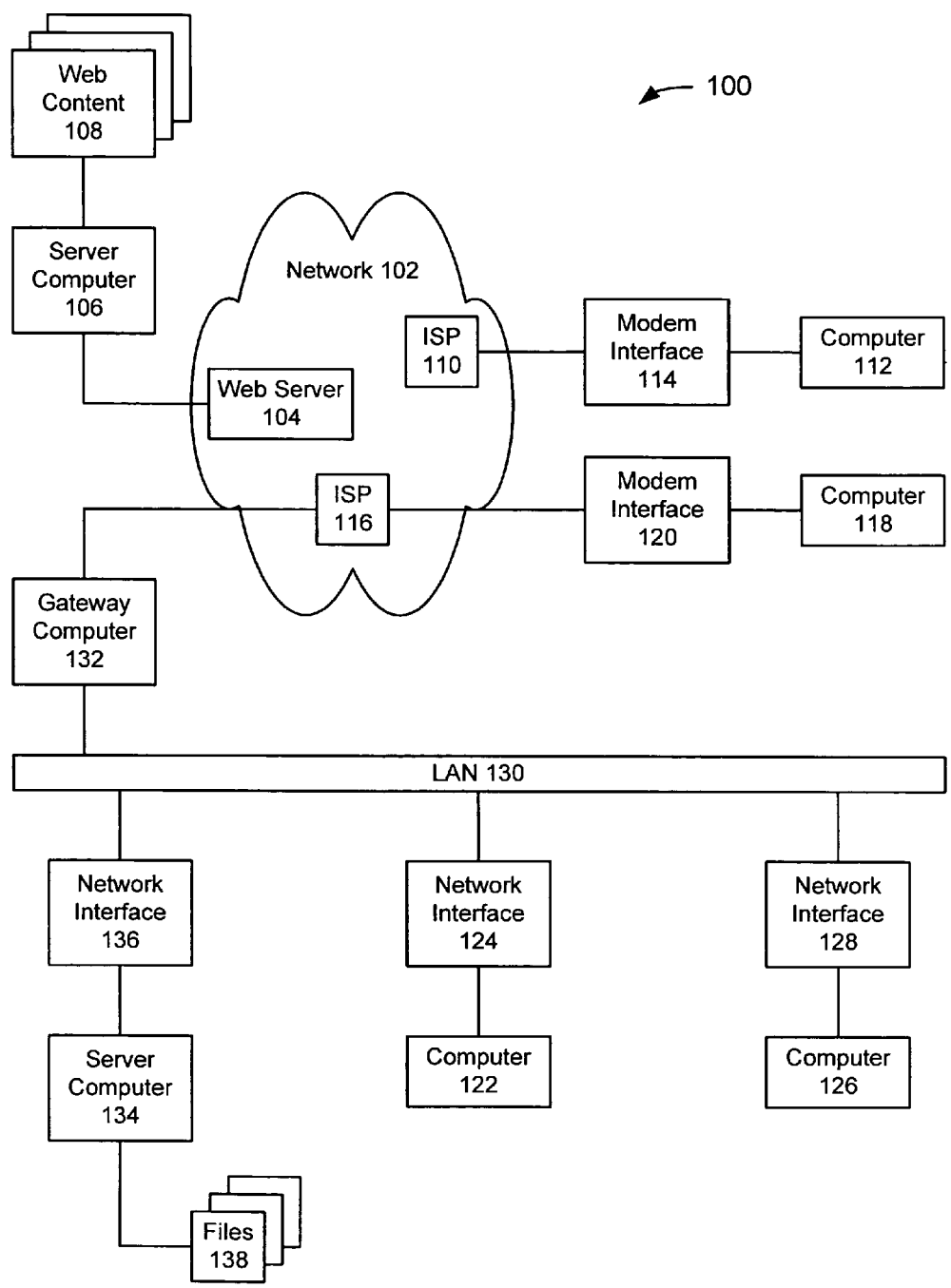
FIG. 1 depicts a networked system for use in an embodiment.
Figure 2:
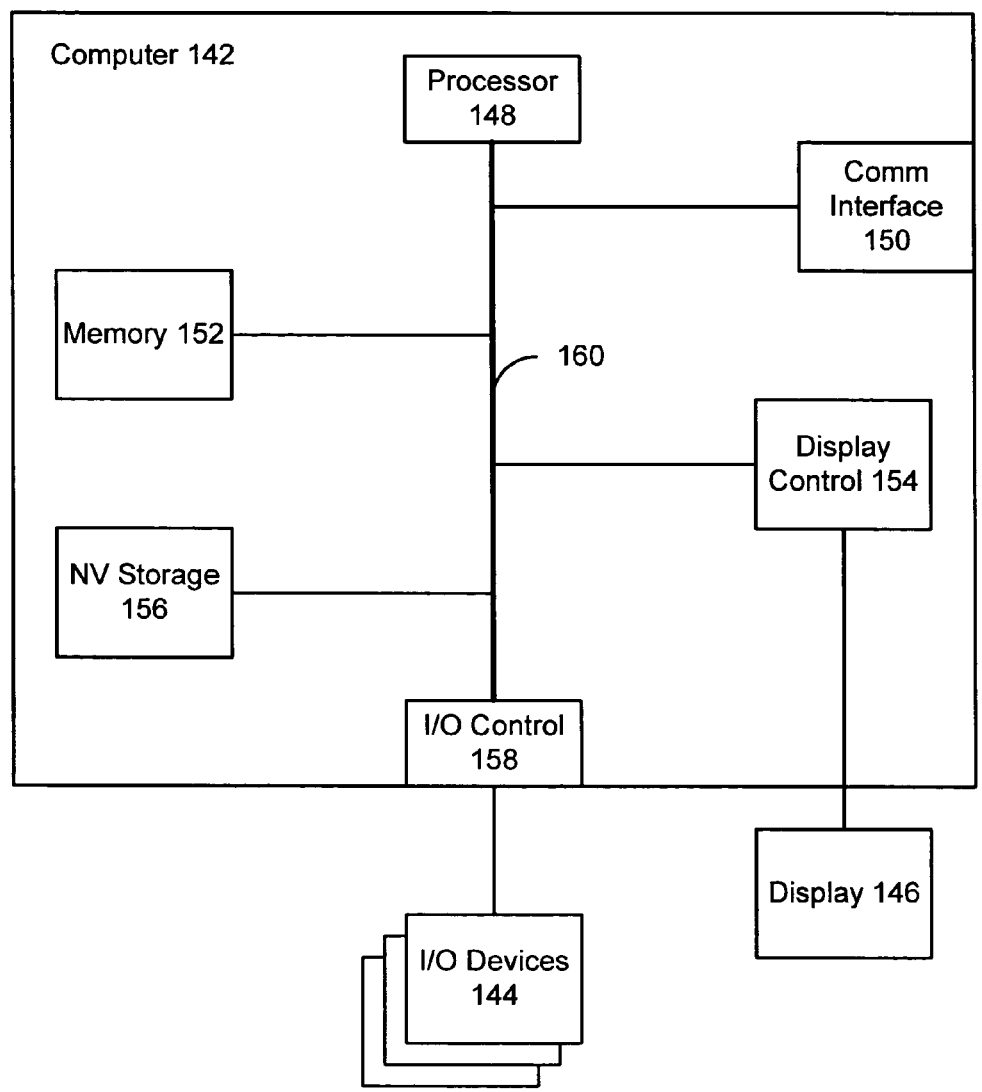
FIG. 2 depicts a computer system for use in the system of FIG. 1.

The following description of FIGS. 1 and 2 is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 depicts a networked system 100 that includes several computer systems coupled together through a network 102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 104 is typically at least one computer system which operates as a server computer system and is configured to operate with the protocols of the world wide web and is coupled to the Internet. The web server system 104 can be a conventional server computer system. Optionally, the web server 104 can be part of an ISP which provides access to the Internet for client systems. The web server 104 is shown coupled to the server computer system 106 which itself is coupled to web content 108, which can be considered a form of a media database. While two computer systems 104 and 106 are shown in FIG. 1, the web server system 104 and the server computer system 106 can be one computer system having different software components providing the web server functionality and the server functionality provided by the server computer system 106, which will be described further below.

Access to the network 102 is typically provided by Internet service providers (ISPs), such as the ISPs 110 and 116. Users on client systems, such as client computer systems 112, 118, 122, and 126 obtain access to the Internet through the ISPs 110 and 116. Access to the Internet allows users of the client computer systems to exchange information, receive and send e-mails, and view documents, such as documents which have been prepared in the HTML format. These documents are often provided by web servers, such as web server 104, which are referred to as being "on" the Internet. Often these web servers are provided by the ISPs, such as ISP 110, although a computer system can be set up and connected to the Internet without that system also being an ISP.

Client computer systems 112, 118, 122, and 126 can each, with the appropriate web browsing software, view HTML pages provided by the web server 104. The ISP 110 provides Internet connectivity to the client computer system 112 through the modem interface 114, which can be considered part of the client computer system 112. The client computer system can be a personal computer system, a network computer, a web TV system, or other computer system. While FIG. 1 shows the modem interface 114 generically as a "modem," the interface can be an analog modem, isdn modem, cable modem, satellite transmission interface (e.g.

"direct PC"), or other interface for coupling a computer system to other computer systems.

Similar to the ISP 114, the ISP 116 provides Internet connectivity for client systems 118, 122, and 126, although as shown in FIG. 1, the connections are not the same for these three computer systems. Client computer system 118 is coupled through a modem interface 120 while client computer systems 122 and 126 are part of a LAN 130.

Client computer systems 122 and 126 are coupled to the LAN 130 through network interfaces 124 and 128, which can be ethernet network or other network interfaces. The LAN 130 is also coupled to a gateway computer system 132 which can provide firewall and other Internet-related services for the local area network. This gateway computer system 132 is coupled to the ISP 116 to provide Internet connectivity to the client computer systems 122 and 126. The gateway computer system 132 can be a conventional server computer system.

Alternatively, a server computer system 134 can be directly coupled to the LAN 130 through a network interface 136 to provide files 138 and other services to the clients 122 and 126, without the need to connect to the Internet through the gateway system 132.

FIG. 2 depicts a computer system 140 for use in the system 100 (FIG. 1). The computer system 140 may be a conventional computer system that can be used as a client computer system or a server computer system or as a web server system. Such a computer system can be used to perform many of the functions of an Internet service provider, such as ISP 110 (FIG. 1). The computer system 140 includes a computer 142, I/O devices 144, and a display device 146. The computer 142 includes a processor 148, a communications interface 150, memory 152, display controller 154, non-volatile storage 156, and I/O controller 158. The computer system 140 may be couple to or include the I/O devices 144 and display device 146.

The computer 142 interfaces to external systems through the communications interface 150, which may include a modem or network interface. It will be appreciated that the communications interface 150 can be considered to be part of the computer system 140 or a part of the computer 142. The communications interface can be an analog modem, isdn modem, cable modem, token ring interface, satellite transmission interface (e.g. "direct PC"), or other interfaces for coupling a computer system to other computer systems.

The processor 148 may be, for example, a conventional microprocessor such as an INTEL PENTIUM microprocessor or MOTOROLA POWERPC microprocessor. The memory 152 is coupled to the processor 148 by a bus 160. The memory 152 can be dynamic random access memory (dram) and can also include static ram (sram). The bus 160 couples the processor 148 to the memory 152, also to the non-volatile storage 156, to the display controller 154, and to the I/O controller 158.

The I/O devices 144 can include a keyboard, disk drives, printers, a scanner, and other input and output devices, including a mouse or other pointing device. The display controller 154 may control in the conventional manner a display on the display device 146, which can be, for example, a cathode ray tube (CRT) or liquid crystal display (LCD). The display controller 154 and the I/O controller 158 can be implemented with conventional well known technology.

The non-volatile storage 156 is often a magnetic hard disk, an optical disk, or another form of storage for large amounts of data. Some of this data is often written, by a direct memory access process, into memory 152 during execution of software in the computer 142. One of skill in the art will immediately recognize that the terms "machine-readable medium" or "computer-readable medium" includes any type of storage device that is accessible by the processor 148 and also encompasses a carrier wave that encodes a data signal.

The computer system 140 is one example of many possible computer systems which have different architectures. For example, personal computers based on an INTEL microprocessor often have multiple buses, one of which can be an I/O bus for the peripherals and one that directly connects the processor 148 and the memory 152 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 152 for execution by the processor 148. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

In addition, the computer system 140 is controlled by operating system software which includes a file management system, such as a disk operating system, which is part of the operating system software. One example of an operating system software with its associated file management system software is the family of operating systems known as Windows® from Microsoft Corporation of Redmond, Washington, and their associated file management systems. Another example of operating system software with its associated file management system software is the LINUX operating system and its associated file management system. The file management system is typically stored in the non-volatile storage 156 and causes the processor 148 to execute the various acts required by the operating system to input and output data and to store data in memory, including storing files on the non-volatile storage 156.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

Figure 3:
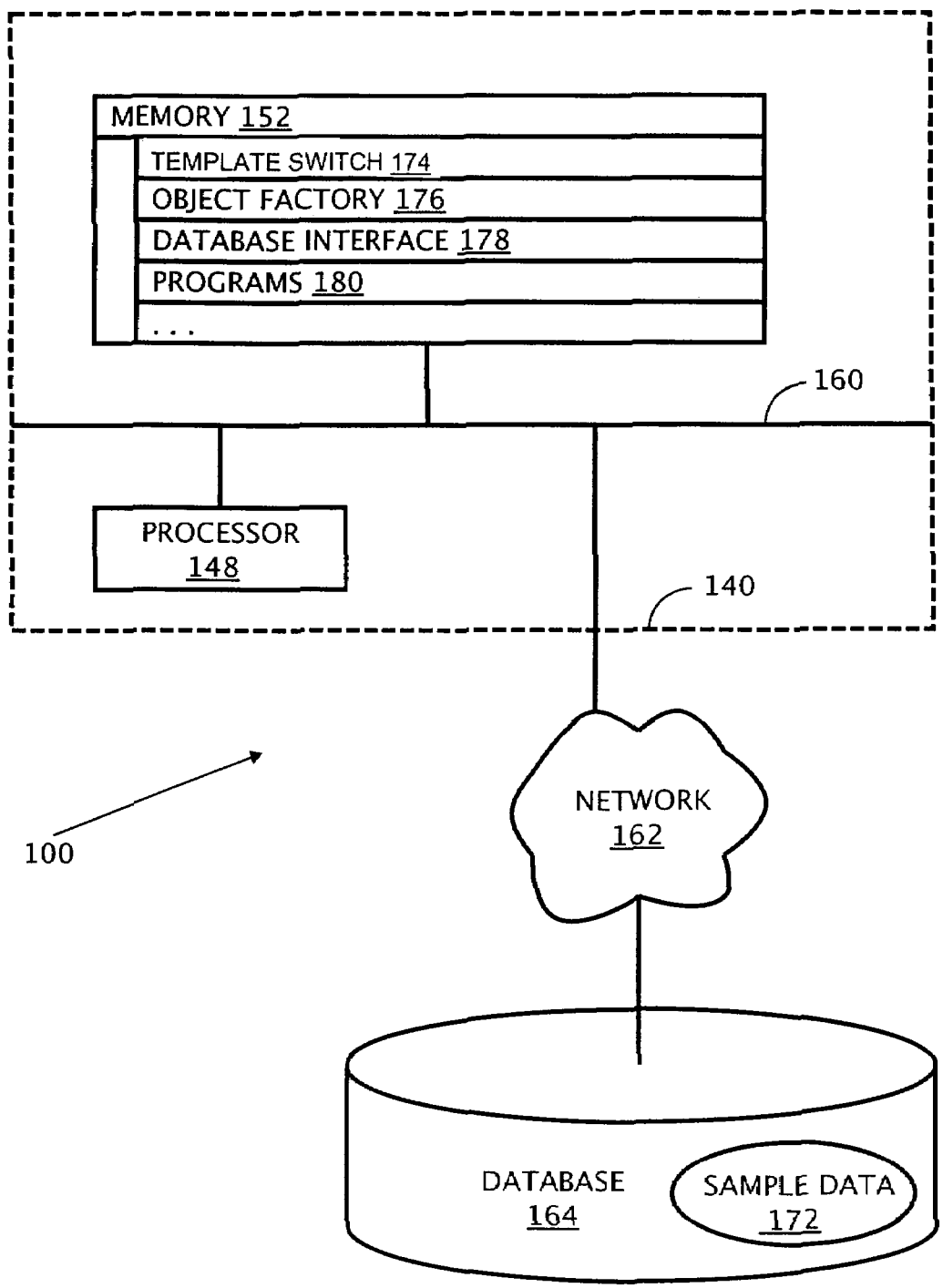
FIG. 3 depicts a portion of the computer system of FIG. 2 and components of the system of FIG. 1.

FIG. 3 depicts a portion of the computer system 140 (FIG. 2) and components of the system 100 (FIG. 1). FIG. 3 depicts the computer system 140, a network 162, and a database 164. The network 162 could be a global information network, such as the Internet, a local or wide area network (LAN or WAN), or some other intranet or network. For example, the network 102 (FIG. 1) could include the network 162. Alternatively, the LAN 130 (FIG. 1) could include the network 162.

The database 164 may be stored in non-volatile storage coupled to and accessible through the network 162. The database could be part of a computer system, such as the computer system 140 (FIG. 2). The database could be served as Web content, such as by the server computer 106 (FIG. 1). The database could be part of a server computer on a LAN or WAN, such as the server computer 134 (FIG. 1). The database 164 is typically accessible through the network 162 by other remote computers. The database 164 includes template data 172. Other data in the database 164 may be referred to as productive data. The template data and productive data may be referred to collectively as data in the database 164. Alternatively, the template data may be referred to as data in a template database and the productive data may be referred to as data in a productive database. In an embodiment, template data may be distinguished from productive data by using a state field that can be set to indicate whether the data is template data. In an alternative embodiment, the template data may be distinguishable by using some other marking, sorting, or identifying technique. Thus, the template data 172 may be logically distinct from the productive data, without being physically separated.

Figure 4:
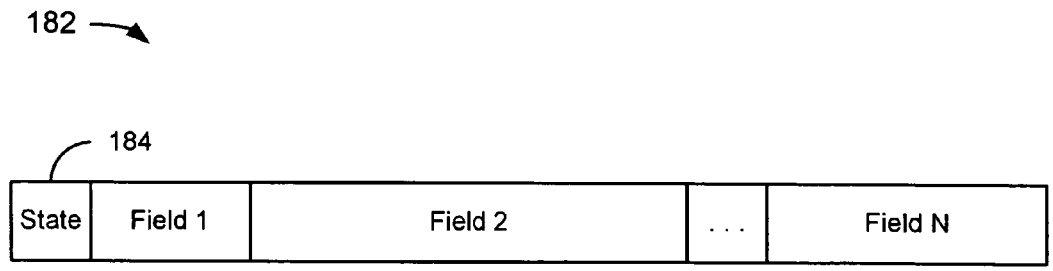
FIG. 4 depicts an exemplary database entry for use with the database of FIG. 3.

The database 164 includes database entries. FIG. 4 depicts an exemplary database entry 182. For the purposes of example, the database entry 182 includes a state field 184 and fields 1 to N. The fields may contain data such as text, numbers, flags, and the like, as is well-known in the field of databases. The state field 184 may contain a value that indicates the state of the data associated with the database entry 182. For example, when a database query for active data is received, the state field 184 may be checked to determine whether the database entry 182 is associated with active data.

In an exemplary embodiment, the state field 184 may include the value 'A', to indicate the database entry 182 is active. Instead, the state field 184 may include the value 'I' to indicate the database entry 182 is inactive. Inactive data may be data that is has been modified by a user but not yet released, data that needs to be double-checked, or some other data that is not activated for general access to users of the database 164. The state field 184 may or may not have other valid values associated with it. One such value may be 'S' to indicate sample data. In an embodiment, the state field 184 may have the value 'T' to indicate that the entry is a template.

It should be noted that the state field 184 may have more valid values that would be set by applications that access the database 164. For example, an application that knows of two valid states (e.g., active or inactive) may generate a query that includes, for example, an active state or an inactive state. The application in this example would not generate a query that includes a template state (because it does not know that a template state is a valid state). In an embodiment, the state is changed by, for example, the database interface 178, according to the template switch 174. For example, the database interface 178 may adjust the query to include a template state instead of an active state. In this way, the application that originated the query may access template data without any adjustment to inform the application that a template state is valid. This can be advantageous when adding new entries, since the values in the various template fields can be used to fill in the new entries when the value of a field has not yet been provided.

Similarly, the database entries themselves need not have additional fields added to incorporate a template database. The state field 184, assuming it already exists in the database, can simply include a different value (e.g., 'T' for template). Alternatively, some other field (other than state) could have a value that indicates data is template data. Accordingly, the database need not be reconfigured, copied, or otherwise modified. Template data is simply written, modified, or deleted without any changes to the productive data in the database, if any. Nevertheless, advantageously, the template data and productive data are distinguishable such that productive data is not modified during template maintenance. Moreover, the template data can be used seamlessly by a database interface even when a requesting program is not aware of template data. In addition, templates may be set to read-only when a database is in operation, preventing accidental modification of template data.

Referring once again to FIG. 3, the computer system 140 includes a processor 148, a memory 152, and a bus 160 that couples the processor 148 to the memory 152. The memory 152 may include both volatile memory, such as DRAM or SRAM, and non-volatile memory, such as magnetic or optical storage. The processor 148 executes code in the memory 152. The memory 152 includes a template switch 174, an object factory 176, a database interface 178, and programs 180.

The object factory 176 instantiates the database interface 178. The database interface 178 may be an object or some other software or firmware data structure.

The programs 180 access the database 164 through the database interface 178. In an alternative embodiment, a database interface may be instantiated for each of the programs 180, for a subset of the programs 180, or for all of the programs 180. The subset of the programs 180 that utilize the same database interface 178 may be, for example, those programs that are used by a particular user. Requests for template data may include an identifiable flag or other value that identifies the request as associated with template data. The flag may be set by the program generating the request, by the database interface 178, by an environment variable, by the user, or by some other mechanism for identifying requests as associated with template data.

In an embodiment, access to the database 164 through the database interface 178 is in the form of a database query from, for example, one of the programs 180. The query may include values that are compared to various fields of database entries in the database 164. A database query may include one or more values that are matched to one or more fields to identify an entry. The values may be included in a database query generated by, for example, one of the programs 180. Database queries are well-understood in the field of databases so a more detailed description of database queries is deemed unnecessary.

The template switch 174 may be an environment variable, a user-dependent environment variable, an object stored in volatile or non-volatile memory that acts like an environment variable, or stored in a server configuration, in a database table or some other medium. Alternatively, the template switch 174 may be enabled according to a value of an environment variable (not shown). The template switch 174 may or may not be included in the database interface 178. In an embodiment, a database query may include a state flag. If the template switch 174 is enabled, then database queries are, in one embodiment, for template data only. For example, if a database query includes a state flag that is set to 'A' (associated with active data), but the template switch 174 is enabled, then the database interface 178 may change the state flag from 'A' to 'T' (associated with template data). As another example, if the database query includes a state flag that is set to 'I' (associated with inactive data), but the template switch 174 is enabled, then the database interface 178 may change the state flag from 'I' to 't' (associated with inactive template data). If the template switch 174 is disabled, template data is read-only.

Advantageously, in an embodiment, programs may access the database 164 normally. In fact, a program may not even be aware that queries are for templates when the template switch 174 is enabled; the creation, update, or deletion of templates are treated just like any other query. Later, if desired, the template switch 174 may be disabled, which allows the use of templates for updating or adding productive data, but without the risk of overwriting a template. The template switch 174 may be implemented efficiently because, for example, turning a switch on or off takes relatively little effort. Moreover, a database interface (or API) may be implemented using, for example, Object-Oriented ABAP classes. So, a class that reads template data may be a subclass of a database interface class and a factory method creates the instances of the database interface class or its subclass dependent on the template switch. In this way, the impact of setting the switch is minimal with respect to an application originating a database query. If access to a database is via a database view, the selection criteria of the view can be adopted in a similar manner.

Figure 5:
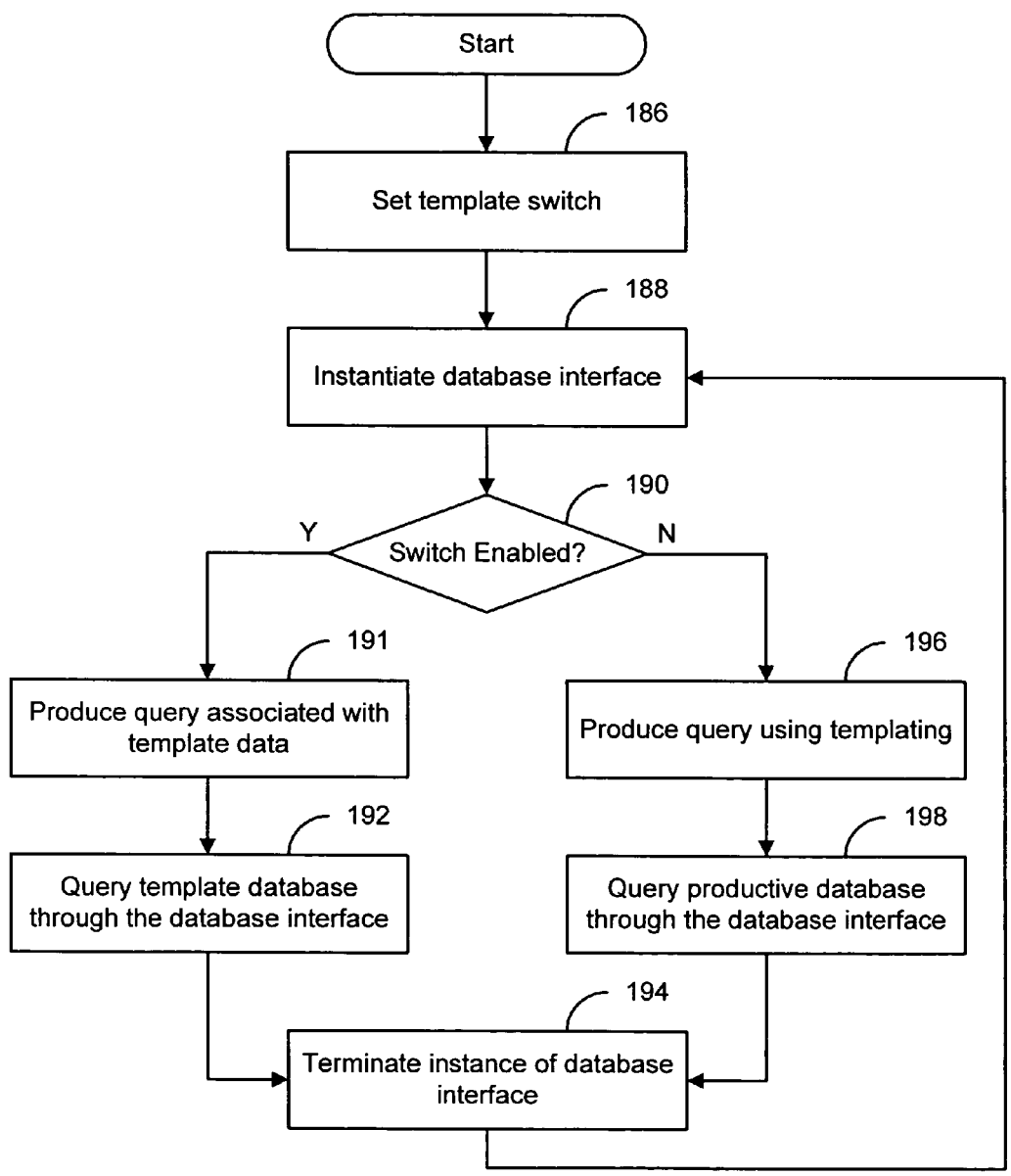
FIG. 5 depicts a flowchart of an exemplary method for providing a database interface according to an embodiment.

Various methods may be used to access a database in accordance with a template switch. FIG. 5 depicts a flowchart of an exemplary method for accessing a database according to an embodiment. In this embodiment, the method starts at module 186 when a request for a database interface is received. The request for a database interface may be provided by a remote or local computer program. Alternatively, the request for a database interface may be generated in response to receiving a request for database access from a remote or local computer program. Setting the template switch may be accomplished when configuring a system for use. For example, if templates are to be created or modified, then the template switch may be enabled. If the system is to be used for productive database queries using templates, the template switch may be disabled. When the template switch is disabled, the templates are read-only. In an alternative embodiment, the template switch may include an "inaccessible" setting that prevents the use of templates (i.e., no read/write or read-only access to template data). It should be noted that the template switch may or may not be set at configuration time. For example, the template switch may be set dynamically at run-time.

In this embodiment, the method continues at module 188 with instantiation of a database interface. Instantiating a database interface may be in response to receiving a request for database access from a remote or local computer program. Accordingly, the database interface may be instantiated dynamically at run-time. In an alternative embodiment, a remote or local computer program may instantiate the database interface directly.

In this embodiment, the method continues at module 190 with a determination of whether the template switch is enabled. The determination may be made by checking an environment variable. The environment variable may be set by an administrator. The administrator may enable a template switch by setting the environment variable accordingly.

In this embodiment, if the template switch is enabled (190-Y), then the method continues at module 191 when a database query with a state associated with template data is produced. The database query may be generated in response to the request, or, if the request has a similar format to the database query, a state field associated with the request may be updated to associate the request with template data, then the updated request can be used as the database query. The method continues at module 192 when a template database is queried via the database interface and at module 194 when the instance of the database interface is terminated.

If, on the other hand, the template switch is disabled (190-N), then, in this embodiment, the method continues at module 196 when a query is produced using templating. It is assumed, for the purposes of example, that the state of the query is associated with productive data when the query is first received. It should be noted that a template is not always necessary when querying productive data, even when using templating. For example, if the query includes a read request, but no write request, then a template may not be necessary, since the query is likely for productive data. On the other hand, a read request that fails, such as a read request for an employee that is not entered into the database, could result in a response, including template data, that asks the originator of the query whether the employee should be added. The use of a template may be desirable if an entry is being added to the database that meets certain prerequisites. For example, if the entry includes a 'first name' field, then a template for employees, customers, or some other template associated with a human being might be appropriate.

In this embodiment, the method then continues at module 198 when a productive database is queried via the database interface and continues at module 194 when the instance of the database interface is terminated. In this embodiment, after module 194, the method continues from module 188. Alternatively, multiple queries could be made through a database interface, which may include repeating modules 192 or 198 (or modules 191 and 192 or 196 and 198). This method and other methods are depicted as serially arranged modules. However, modules of the methods may be reordered, or arranged for parallel execution as appropriate.

Figure 6A:
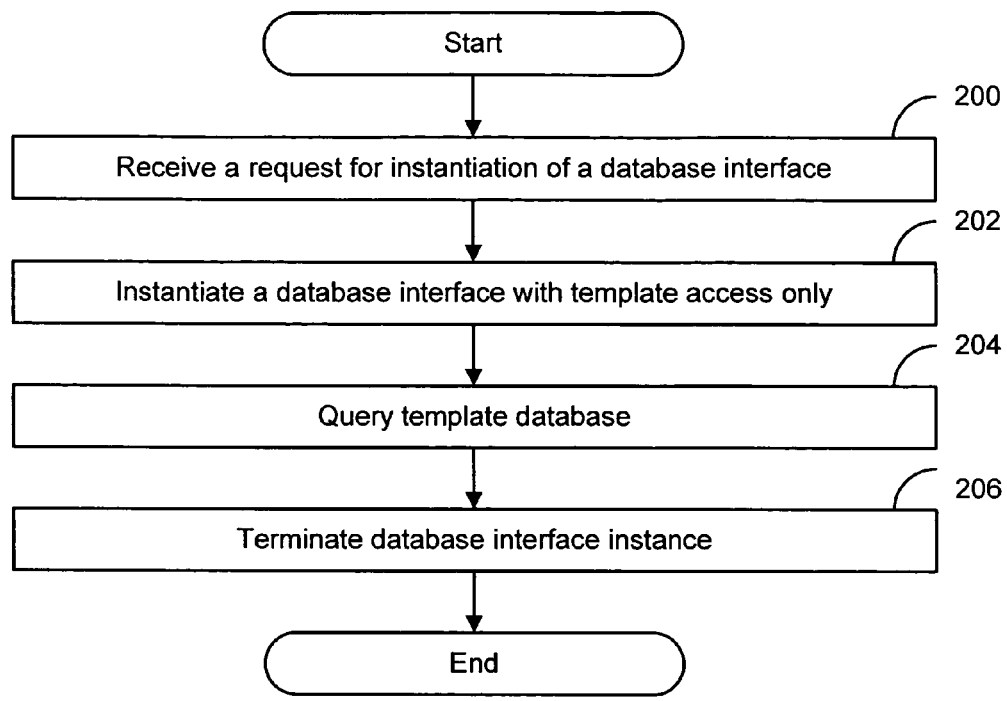
FIGS. 6A and 6B depict flowcharts of exemplary methods for providing a database interface according to embodiments.

FIG. 6A depicts a flowchart of an alternative method for template management when a template switch is on. When the template switch is on, the system may be referred to as being in template-editing mode. In template-editing mode, the template database is visible, but the productive database is invisible. The method begins at module 200 when a database access request is received for instantiation of a database interface. The request may or may not include a database query in a productive data database query format.

In this embodiment, the method continues at module 202 when a database interface is instantiated with template access only. When the database interface is instantiated with template access only, database access requests may be changed by the database interface from a productive data database query format to a template data database query format. This change may involve changing the state of the database access requests to a state that is associated with a template database.

In this embodiment, the method continues at module 204 when a template database is queried and the method ends at module 206 when the database interface instance is terminated.

Figure 6B:
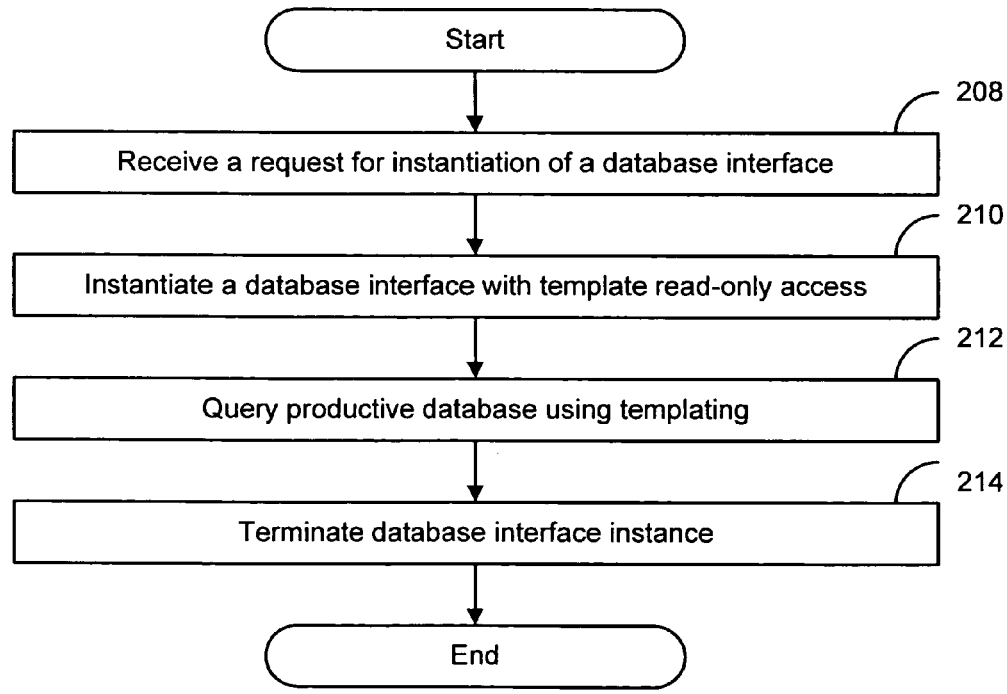

FIG. 6B is similar to FIG. 6A, but depicts a flowchart of an alternative method for template utilization when a template switch is off. When the template switch is off, the system may be referred to as being in templating mode. In templating mode, the template database is read-only and the productive database is available as normal. Templating mode facilitates safeguarding data entry and speeding up data entry, as is known to those skilled in the use of templates in data entry. The method begins at module 208 when a database access request is received for instantiation of a database interface. The request may or may not include a database query in a productive data database query format. In an embodiment, when the template switch is off, access to the template database is read-only. However, in an alternative embodiment, management of the template database may be permitted if the request is received in a template data database query format.

In this embodiment, the method continues at module 210 when a database interface is instantiated with template read-only access. When the database interface is instantiated with template read-only access, database access requests may utilize templates when appropriate, but database access requests will not, in an embodiment, result in the modification of the template database. Thus, the template database is protected from accidental modification.

In this embodiment, the method continues at module 212 when a productive database is queried using templating. This may involve reading a template implicitly when a record is requested that does not exist in the productive database.

In this embodiment, the method ends at module 214 when the database interface instance is terminated.

Figure 7:
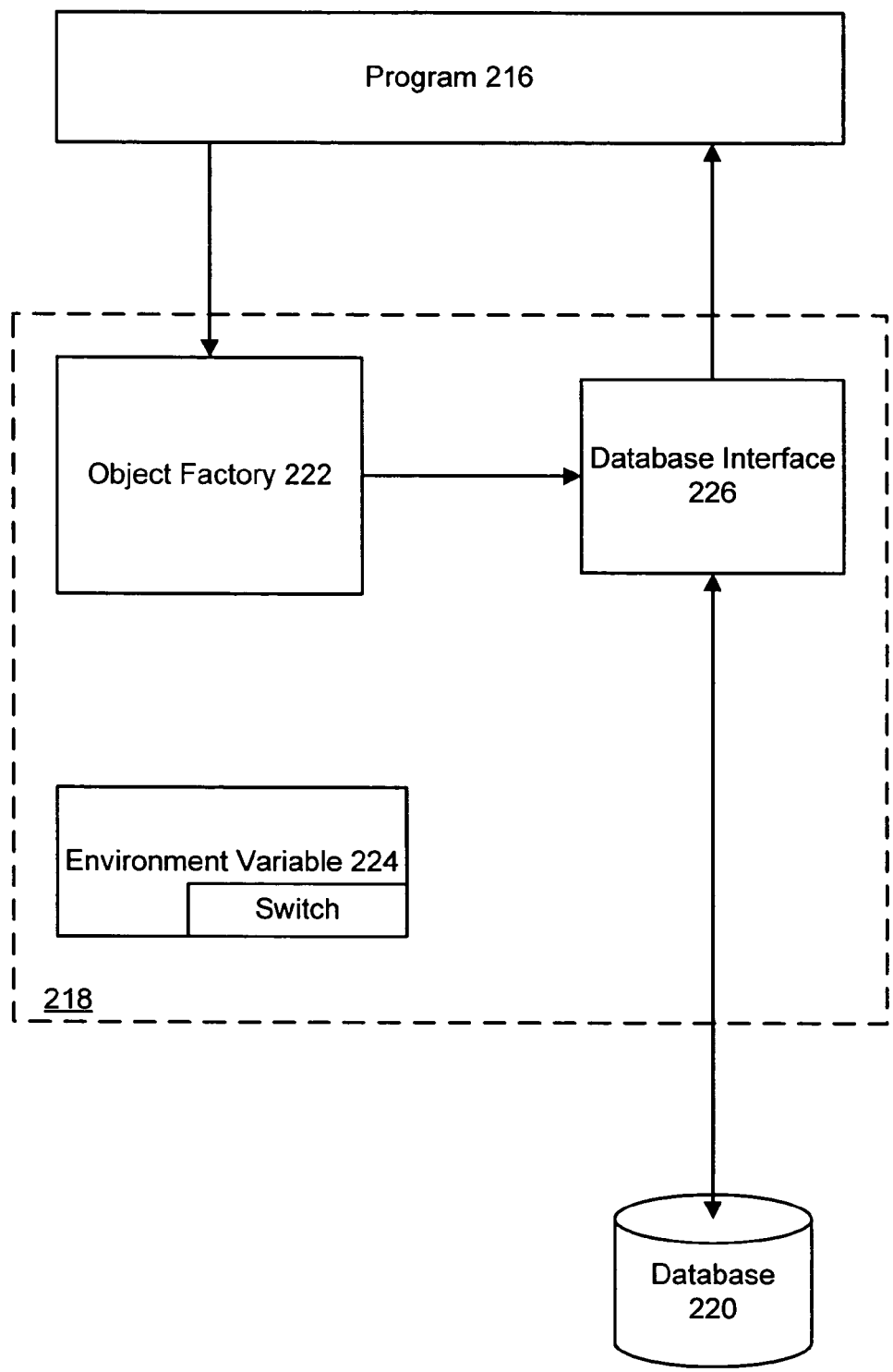
FIG. 7 depicts a system for use in an embodiment.

Various systems facilitate the provision of a database interface according to methods such as described with reference to FIG. 5, for example. A system that facilitates the provision of a database interface according to methods such as described with reference to FIG. 5, for example, is depicted in FIG. 7. FIG. 7 includes a program 216, an intermediary 218, and a database 220. The intermediary 218 includes an object factory 222, an environment variable or switch 224, and a database interface 226. In operation, the program 216 sends a database access request to the intermediary 218. The object factory 222, in response to the database access request and in accordance with the switch 224, spawns the database interface 226. If the switch 224 is enabled, then the database interface 226 provides for access to a template database (not shown), but productive data in the database 220 is invisible. If the switch 224 is disabled, then the database interface 226 permits access to the database 220 and read-only access to the template database. Using the system depicted in the example of FIG. 7, a system that includes the program 216 can access the database 220 normally, regardless of the setting of the switch 224. The database interface 226 modifies the request from the program 216 according to the switch 224 without changing any parameters within the program 216.

Figure 8:
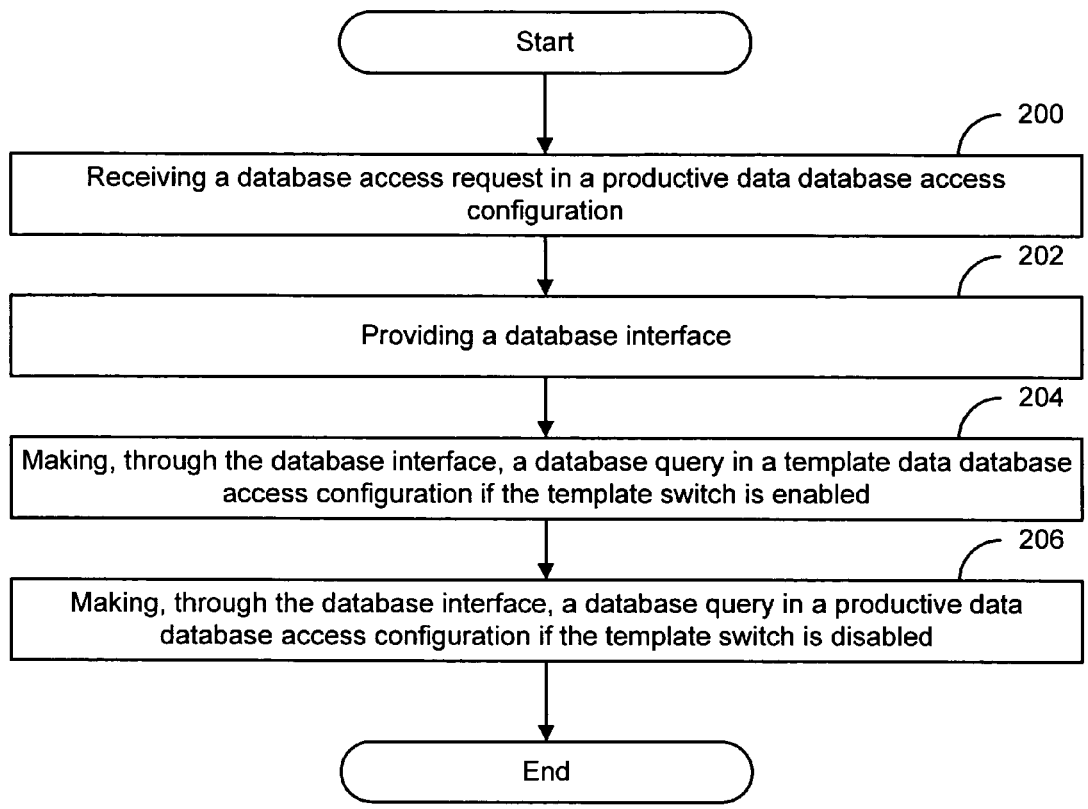
FIG. 8 depicts a flowchart of an exemplary method for providing a database interface according to an embodiment.

Various methods may be used to provide a database interface that facilitate template management and utilization such as the database interface 226, for example. FIG. 8 depicts a flowchart of an exemplary method for template management and utilization.

In this embodiment, the method starts at module 228 when an instance of a database interface is requested in a productive data database configuration. The request may be received from a local or remote program during runtime. In this embodiment, at module 230 an instance of a database interface is provided. In this embodiment, at module 232, a database query in a template data database access configuration is made through the database interface if the template switch is enabled. In this embodiment, at module 234, a database query in a productive data database access configuration is made through the database interface if the template switch is disabled.

Figure 9:
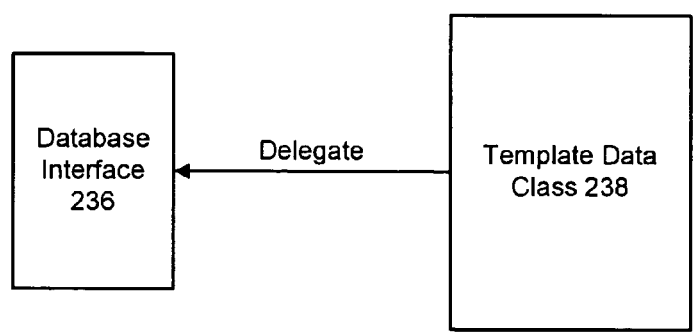
FIG. 9 depicts an example of delegation of a database interface according to an embodiment.

The database interface 226 may be delegated in accordance with normal object-oriented inheritance. FIG. 9 illustrates the delegation of a database interface 236 from a template data class 238. The delegation may be in the form of a method or function call. The database interface 236 may be a wrapper class.

While this invention has been described in terms of certain exemplary embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A system, comprising:
   a hardware memory device storing a database including productive data and template data; and
   a hardware processing device programmed to implement:
   a template switch that may be set to enabled or disabled; and
   an object factory, coupled to the template switch;
   wherein:
   in response to a database access request having a productive data database access configuration:
   the object factory instantiates a database interface;
   if the template switch is enabled, the instantiated database interface changes the configuration of the database access request from the productive data database access configuration to a template data database access configuration and forwards the changed database access request as a query to the database; and
   if the template switch is disabled, the instantiated database interface forwards the database access request in the productive data database access configuration as the query to the database;
   if the database receives the query in the template data database access configuration, the database provides, in response to the query, read/write access for editing templates; and
   if the database receives the query in the productive data database access configuration, the database provides, in response to the query, read/write access for editing only non-template data.

2. The system of claim 1, wherein the template switch includes an environment variable.

3. The system of claim 1, wherein the template switch setting is associated with a value of an environment variable.

4. The system of claim 1, wherein the object factory is configured to instantiate the database interface according to the template switch.

5. The system of claim 1, wherein, if the database receives the query in the productive data database access configuration, the database further provides, in response to the query, read-only access for reading the templates.

6. A computer-implemented method, comprising:
receiving a database access request, by a processing device, in a productive data database access configuration;
selecting a template switch setting, via the processing device;
responsive to the receipt of the database access request in the productive data database access configuration:
providing, by the processing device, a database interface;
if the template switch is enabled, the database interface:
changing the configuration of the database access request from the productive data database access configuration to a template data database access configuration; and
forwarding the changed database access request as a query to a database; and
if the template switch is disabled, the database interface forwarding the database access request in the productive data database access configuration as the query to the database;
if the database receives the query in the template data database access configuration, the database providing, in response to the query, read/write access for editing templates; and
if the database receives the query in the productive data database access configuration, the database providing, in response to the query, read/write access for editing only non-template data.

7. The method of claim 6, wherein the providing a database interface step includes instantiating the database interface according to the template switch setting.

8. The method of claim 6, further comprising terminating the database interface after the database query is completed.

9. The method of claim 6, further comprising setting the template switch according to an environment variable.

10. The method of claim 6, wherein, if the database receives the query in the productive data database access configuration, the database further provides, in response to the query, read-only access for reading the templates.

11. A computer-implemented method, comprising:
setting, via a processing device, an environment variable to enable read-write access to template data of a database;
receiving, by the processing device, a request for a database interface in a productive data access configuration that provides for direction of the request toward the database for read/write access to only the non-template data and read-only access to template data;
producing, by the processing device, a database interface with access to the template data in accordance with the environment variable; and
the database interface redirecting the request toward the template data of the database for receiving read/write access to the template data.

12. The method of claim 11, further comprising producing a database interface with read-only access to the template data if the environment variable is disabled.

13. The method of claim 11, further comprising instantiating the database interface according to the state of the environment variable.

14. The method of claim 11, wherein template data may have one of a plurality of states.

15. A database access method, comprising:
storing a plurality of data entries in a database included in a hardware memory device, each entry including a plurality of fields, the plurality of fields including a status field, wherein the status field is populatable with any one status indicator selected from a group that includes a template status and a non-template status;
determining, by a processing device, whether a settable environment variable is set to on or off;
for processing a database access query of the database, the query including a parameter indicating that entries satisfying the query are limited to entries having respective status fields populated with the non-template status for read/write access:
an application forwarding the query to an application program interface (API) implemented via the processing device;
the API implementing a database interface in response to receipt of the query; and
the implemented database interface accessing the database according to the query;
wherein:
if the environment variable is determined in the determining step to be set to on, the query is modified prior to the accessing of the database, the modification including changing the parameter to indicate that entries satisfying the query are limited to entries having respective status fields populated with the template status for read/write access; and
if the environment variable is determined in the determining step to be set to off, the accessing of the database according to the query is performed without the modification, and, responsive to the query, read/write access is provided to the entries having the respective status fields populated with the non-template status and read-only access is provided to the entries having the respective status fields populated with the template status.

16. The database access method of claim 15, wherein, subsequent to setting of the environment variable, a plurality of database queries are processed in accordance with the setting of the environment variable.

17. The database access method of claim 15, wherein the implemented database interface is an instantiated one of a plurality of database interface sub-classes selected for instantiation from a database interface class depending on the setting of the environment variable.

18. The database access method of claim 17, wherein a single instantiated database interface sub-class is implemented for a plurality of programs.

19. The database access method of claim 18, wherein different database interface sub-classes are instantiated for different users.

20. The database access method of claim 15, wherein the implementing of the database interface by the API in response to receipt of the query includes instantiating one of a plurality of database interface sub-classes from a database interface class depending on the setting of the environment variable.

21. The database access method of claim 15, wherein:
- the template status includes any one status selected from a group that includes a template-active status and a template-inactive status; and
- the non-template status includes any one status selected from a group that includes an active status and an inactive status.

22. The database access method of claim 21, wherein the template-active and active statuses each indicates that data associated with the respective status is released for general access to users of the database and the template-inactive and inactive statuses each indicates that data associated with the respective status is not released for general access to users of the database.

23. The database access method of claim 21, wherein:
- if the query prior to the modification includes the parameter indicating that entries satisfying the query are limited to entries having respective status fields populated with the active data status, the modification includes changing the parameter to indicate that entries satisfying the query are limited to entries having respective status fields populated with the template-active status; and
- if the query prior to the modification includes the parameter indicating that entries satisfying the query are limited to entries having respective status fields populated with the inactive data status, the modification includes changing the parameter to indicate that entries satisfying the query are limited to entries having respective status fields populated with the template-inactive status.

24. The database access method of claim 15, wherein the query is one of a create query, an update query, and a delete query.

25. The database access method of claim 15, wherein:
- if the environment variable is set to on, entries having respective status fields populated with the template status are read/write accessible for satisfying the query and other entries are not accessible for satisfying the query; and
- if the environment variable is set to off, entries having respective status fields populated with the template status are read-only accessible for satisfying the query.

* * * * *